Figure 1:
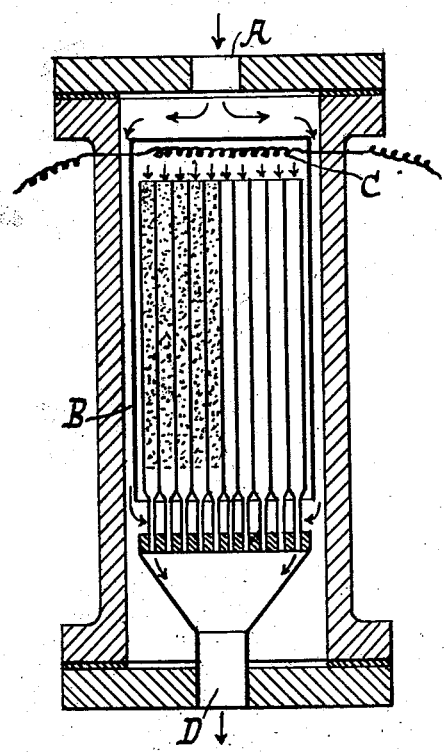

Aug. 2, 1932.  A. BERENBRUCH  1,869,736
APPARATUS FOR CARRYING OUT EXOTHERMIC CATALYTIC GAS REACTIONS
Filed April 21, 1928

INVENTOR
Albert Berenbruch
BY
Hauff Warland
ATTORNEYS

Patented Aug. 2, 1932

1,869,736

UNITED STATES PATENT OFFICE

ALBERT BERENBRUCH, OF NEUROSSEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

APPARATUS FOR CARRYING OUT EXOTHERMIC CATALYTIC GAS REACTIONS

Application filed April 21, 1928, Serial No. 271,828, and in Germany May 7, 1927.

This invention relates to improvements in carrying out exothermic catalytic gas reactions and in apparatus therefor.

It is recognized as useful, and sometimes even necessary, that exothermic catalytic gas reactions be carried out either in several stages, intermediate cooling being used, or that the heat of the reaction be carried away in some way or other as soon as generated, thereby regulating the reaction temperature and maintaining it at such a level that a maximum output is obtained for a given velocity of the reaction and the corresponding gaseous equilibrium. In order to effect this, it is essential that the temperature in the chamber containing the catalyst should be approximately constant throughout the reaction, or slowly decline, in the catalyst layer, in the direction taken by the gases.

Vessels have already been designed in which for the purpose above mentioned, the chamber containing the catalyst is divided into separate parallel tubes, charged with the catalyst, the said tubes being secured in a tube plate at both ends and bathed by the entering cold fresh gas before the latter passes over or through the catalyst. In this arrangement, however, owing to the distance at which the tubes have to be spaced in order to bring the gas into contact with the whole surface of the tubes, the entire vessel space is very imperfectly utilized, and for the same reason the transmission of heat from the catalytic mass to the fresh gas is very incomplete.

It has also been proposed to arrange the catalytic mass around the tubes, in which case the latter must be set still further apart. In this case, the fresh gas first passes through the tubes, from below upwards, and then through the catalytic mass from above downwards. In this case also, the exchange of heat is poor, owing to the small superficial area of the tubes.

I have now found that particularly good regeneration and distribution of the heat, coupled with a favorable utilization of space, and consequently a considerable improvement is attained by passing the gas through tubes containing the catalyst, which tubes may be fastened at only one end, if so desired, to a tube plate and which are so closely packed together in the form of a bundle that the fresh gas led past the tubes, on the outside of the same, travels at higher velocity than it does in the tubes containing the catalyst. In this manner the fresh gas is first led through the spaces between the tubes, for the purpose of an exchange of heat with the catalyst, and then preferably in the reverse direction through the tubes containing the catalyst. It is advisable to taper down the tubes to a small diameter at the end at which they are connected to the tube plate, the said tapering affording the possibility of distributing the entering fresh gas uniformly over the spaces between the tubes. Under certain circumstances the effect of the arrangement may be substantially increased by making the tubes of polygonal shape in cross-section such as square or hexagonal, instead of circular or oval, in order to utilize their superficial area more completely.

The warming up of the vessel to the reaction temperature is preferably effected by means of electric heating devices.

The invention will be further illustrated with reference to the accompanying drawing in which a preferred construction of reaction vessel for carrying the invention into practical effect is shown. Fig. 1 shows a vertical section of such a reaction vessel. The cold fresh gas enters the vessel at the upper end thereof at A and flows in the first place along the inside of the shell. On reaching the end of the guide tube B, the fresh gas first passes into the intermediate spaces between a sheaf of tubes, ascending therethrough and passing, as required, over an electric heating device C and then enters the said tubes, that is, into the layer of the catalyst, at their upper end. In traversing this layer, the heat of the reaction is transmitted to the fresh gas flowing in the opposite direction on the outside. The gaseous mixture issues from the furnace at the lower part D thereof. It is unnecessary to fill the tubes completely with the catalytic material; and they may for example be filled with the said material in their upper portion alone, according to what is necessary for the reaction, the remaining portion of the tubes serving merely as a heat regenerator.

Figure 2:
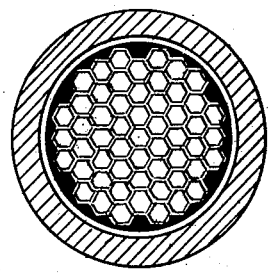

The larger intermediate spaces between the tubes sometimes unavoidable (for example when round tubes are used) and which are unfavorable to heat regeneration, may be charged with inert fillers, such as inserted iron rods, and thereby considerably reduced in dimensions. Large intermediate spaces may be avoided in a technically very simple manner, by making the individual catalyst tubes of polygonal shape in cross-section, for example square or hexagonal, (see Fig. 2) so that the said tubes will lie still more closely together, the chamber containing the catalyst will be larger in proportion to the total space, and the gas to be regenerated will flow at increased velocity between the parallel surfaces in close juxtaposition, the most favorable conditions for heat transmission being thereby established. In the case of round tubes, for example, the space surrounding the tubes occupies 22 per cent of the total space taken up by the sheaf of tubes whereas, in the case of hexagonal tubes, it occupies only 3 to 5 per cent. The sheaf of tubes may be arranged in the form of a unit of any desired cross-sectional shape; and, in some cases, it is also advantageous to insert intermediate pieces between the parallel walls.

The tubes, especially those of regular hexagonal cross-section, may also be disposed with their longitudinal sides in contact so as to avoid interstices entirely, the whole then representing a chamber subdivided into numerous compartments by separating walls. In this case some of the tubes are filled with the catalyst, the remainder being left empty, or charged with fillers, these being hereinafter referred to as regenerative spaces. In this arrangement it is advisable that the walls of the regenerative spaces should be in common with those of the adjoining spaces containing the catalyst. The other separating walls in contact with each other then act solely to conduct heat to the regenerative spaces in which the heat is taken up by the fresh gas, the gas being preferably passed in an opposite direction to that in the said regenerative spaces.

In this type of arrangement a substantial improvement in the utilization of the vessel space and also in the regeneration of heat may be effected by inserting into the empty tubes, or in the tube-like intermediate spaces formed by a plurality of tubes, tubes of smaller diameter, preferably coaxially and in such a manner as to leave only a small space for the passage of the fresh gas between the outer and the inner tubes.

Figure 3:
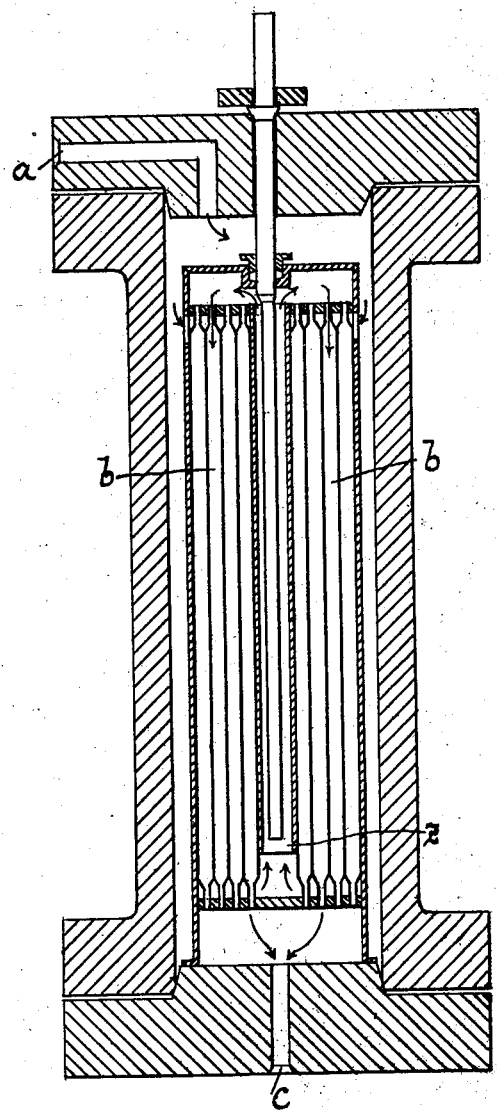

A further modification for carrying out the process of the present invention is illustrated in Fig. 3 in which the fresh gases introduced and the gases passing over the catalyst both flow in the same direction.

The cold gas entering into the reaction vessel at $a$ passes downwards between the hot bundles of tubes $b$ which are filled with the catalyst and then passes upwards through the central tube $e$, then enters into the catalyst tubes through which the gas passes in a downward direction and then leaves the reaction vessel at $c$.

This arrangement is particularly advantageous for carrying out reactions which are accompanied by strong evolution of heat, which evolution does not, however, take place uniformly over the whole length of the catalyst. In this manner it is brought about that at that point of the reaction vessel where the evolution of heat is strongest, namely at the beginning of the catalyst layer, the amount of heat taken off by the cold gases is greatest, since the difference of temperature between the two gases is maximal at this point. For some reactions, it may be advantageous to heat up the fresh gas to a certain extent in order to avoid cooling the catalyst tubes too strongly. This preheating may take place either outside or within the reaction vessel and may be carried out by any suitable heating device, or the heat contained in the gases issuing from the bundles of tubes may be wholly or in part employed to supply heat to the fresh gas by a heat exchanger operated on a counter current system, which heat exchanger may be of any known construction.

What I claim is:—

1. Apparatus for carrying out exothermic catalytic gas reactions, comprising a reaction vessel in which tubes containing a catalyst are closely packed together in a bundle.

2. Apparatus for carrying out exothermic catalytic gas reactions, comprising a reaction vessel with tubes containing a catalyst, the said tubes being substantially parallel and the walls of the said tubes being in contact with each other.

3. Apparatus for carrying out exothermic catalytic gas reactions, comprising a reaction vessel with tubes containing a catalyst, said tubes being substantially parallel and in contact with each other by having part of their walls in common.

4. Apparatus for carrying out exothermic catalytic gas reactions, comprising a reaction vessel, tubes therein, at least some of said tubes containing a catalyst, a passageway surrounding said catalyst-carrying tubes, the sectional area of said passageway being less than the combined sectional area of said catalyst-carrying tubes, and means for causing gas to pass first through said passageway and then through said tubes.

5. Apparatus for carrying out exothermic catalytic gas reactions, comprising a reaction vessel, a plate mounted therein, tubes mounted in said vessel having tapered end portions inserted in said plate, at least some of said tubes containing a catalyst, a passageway surrounding said catalyst-carrying tubes, the sectional area of said passageway being less than the combined sectional area of said catalyst-carrying tubes, and means for causing gas to pass first through said passageway and then through said tubes.

6. Apparatus for carrying out exothermic catalytic gas reactions, comprising a reaction vessel, tubes of polygonal cross-sections in said reaction vessel, at least some of said tubes carrying a catalyst, a passageway surrounding said catalyst-carrying tubes, the sectional area of said passageway being less than the combined sectional area of said catalyst-carrying tubes, and means for causing gas to pass first through said passageway and then through said tubes.

7. Apparatus for carrying out exothermic catalytic gas reactions, comprising a reaction vessel, tubes therein, at least some of said tubes containing a catalyst and being closely packed together in a bundle, a passageway surrounding said catalyst-carrying tubes, inert filling materials in said passageway, the sectional area of said passageway being less than the combined sectional area of said catalyst-carrying tubes, and means for causing gas to pass first through said passageway and then through said tubes.

In testimony whereof I have hereunto set my hand.

ALBERT BERENBRUCH.